United States Patent Office 2,938,892
Patented May 31, 1960

---

2,938,892

AMIDES AND PROCESS OF PREPARING SAME WITH A MONOCARBODIIMIDE

John C. Sheehan, Cambridge, Mass., assignor to Arthur D. Little, Inc., Cambridge, Mass., a corporation of Massachusetts No Drawing. Filed Oct. 10, 1958, Ser. No. 766,406

22 Claims. (Cl. 260—112)

The present invention relates to the formation of peptide and other amide linkages, to the chemical agents which facilitate the formation of such linkages and to the treatment of protein and peptide materials with such agents.

This application is a continuation-in-part of United States application Serial No. 641,853, filed February 25, 1957, now abandoned, which, in turn, is a continuation-in-part of Serial No. 551,331, filed December 7, 1955, now abandoned, for Product and Process.

It has now been found that peptides and other amide linkages may be formed readily in the presence of an aliphatic carbodiimide. The aliphatic carbodiimides of the present invention have the general structure

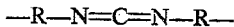

in which at least one aliphatic carbon atom is attached to one of the nitrogen atoms of the —N=C=N— structure. Such aliphatic radicals may be cyclohexyl, ethyl, n-propyl, isopropyl, n-butyl, sec-butyl, iso-butyl, tert-butyl, amyl, hexyl, heptyl, octyl, nonyl, decyl, undecyl, dodecyl, benzyl, α- and β-phenylethyl, ethyl morpholinyl, diethylaminoethyl, ethylpiperidyl, α-, β- and γ-methyl- or ethylpyridyl.

The carbodiimides of the present invention may be prepared in accordance with the general method of E. Schmidt, F. Hitzler and E. Lahde, Ber. 71, 1933 (1938), from the corresponding thioureas by oxidation with mercuric oxide in acetone. The thioureas may be prepared from the corresponding amine by reaction with carbon disulfide in the case of symmetrical thioureas. The unsymmetrical thioureas may be prepared by interaction of an amine with an isothiocyanate. The carbodiimides are also preparable from the corresponding ureas, and are regeneratable after use, thus permitting recycling of the condensation agent, following the procedure of Amiard, G. and Heymes, R., Bull. Soc. Chim. France, 1360 (1956).

Of the carbodiimides of the present invention those most preferred are the water-soluble carbodiimides since the most useful applications of the process involve the use of aqueous media either during amide formation, or in the purification of the amide or in the separation of the resulting urea which may, if desired, be regenerated to carbodiimide and reused. Carbodiimides bearing tertiary amino groups may be rendered soluble in water by neutralizing said amino group with an acid capable of forming a substantially neutral salt with the tertiary amine. Such acids include the hydrohalic group, hydrogen chloride, hydrogen bromide and hydrogen iodide, sulfuric acid, sulfonic acids, nitric acid, phosphoric acid, phosphonic acids but ordinarily do not include carboxylic acids since the latter place in the carbodiimide a carboxyl group which provides a carboxyl group as the reactant in combining with the amino group of the other reactant to form an amide linkage. Also, carbodiimides bearing tertiary amino groups may be rendered water soluble by quaternization with methyl p-toluenesulfonate (methyl tosylate), methyl bromide, methyl iodide, benzyl bromide, ethyl iodide, ethyl bromide, benzyl iodide, ethyl p-toluenesulfonate (ethyl tosylate), methyl sulfate, ethyl sulfate and the like. Other groups which render the carbodiimides water soluble include sulfonates, sulfates, phosphates, phosphonates, guanidinium, polyhydroxy, and polyether groups. Where the aliphatic group attached to one of the nitrogen atoms of the —N=C=N— is of small molecular size or, in addition, contains a polar group, water solubility is imparted. Such groups are ethyl, dimethylaminoethyl, hydroxyethyl and the like. In rendering the carbodiimide water soluble essentially neutral groups should be employed. Sulfonic acid, carboxylic acid and quaternary ammonium base groups are examples of groups that are often too acidic or basic to be employed directly in the carbodiimides of the present invention.

As is evident to those skilled in the art the reaction shown in the accompanying detailed examples involves the condensation of a primary or secondary amino group and a carboxyl group with the elimination of a molecule of water and formation of an amide bond. This water is picked up by the carbodiimide, preferably monocarbodiimide, resulting in conversion of the carbodiimide to the corresponding urea. This reaction is illustrated by the following general equation in which only the functional groups involved are shown:

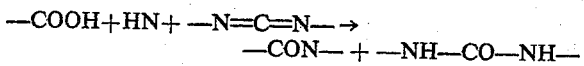

This reaction occurs readily under mild conditions of temperature with a high degree of selectivity providing high yields and a minimum of side reactions and resultant by-products which would require extensive purification. The reaction can be carried out in a wide variety of solvents ranging from completely organic media such as dioxane, tetrahydrofuran, methylene chloride, acetonitrile, benzene, ethyl acetate, hexane, acetone, formamide, dimethyl formamide with and without lithium chloride to aqueous systems including water alone or with acetone, dioxane, tetrahydrofuran, acetonitrile and the like. With the instant water-soluble carbodiimide condensing agent, it is also practical to use organic solvent during the amide formation and aqueous systems for subsequent purification and removal of the urea and unchanged carbodiimide. The term "water soluble" as used in the specification and claims with reference to carbodiimide refers to carbodiimides having a solubility in water to an extent of at least 0.01% by weight and preferably at least 0.1% by weight. Pressure has not been shown to be a factor. No catalysts have been found to offer any advantage, nor have the concentration of reactants and carbodiimide been shown to be critical. Of course, it is best to employ equimolecular proportions of reactants in the usual case although when carrying out the reaction in aqueous, alcoholic or other possibly reactive media it is advantageous to employ an excess of the carbodiimide reactant.

While the bonds formed in the examples are generally described as peptide linkages it will be recognized that the carbodiimides of the present invention are equally applicable to the formation of amide bonds generally. The functional groups involved in the reaction are the same whether protein, amino acids, peptides or non-peptide reactants are employed and the linkage or grouping produced, —CO—N—, is the same. This is shown, for example, in the polymerization of adipic acid and hexamethylenediamine which proceeds through the formation of amide bonds using the carbodiimides of the present invention under mild conditions of temperature.

In this invention, the utilization of a carbodiimide as condensing agent effects the formation of an amide by condensing an amine containing an amino group, capable of being acylated and having at least one hydrogen attached to the amino nitrogen, with an organic carboxylic acid capable of forming amide bonds.

In accordance with the accompanying detailed examples, the reaction is effected between carboxylic acids and ammonia, primary and secondary amines; illustratively, primary aliphatic amines; such as, for example, methylamine, ethylamine, propylamine, butylamine, hexylamine, allylamine; secondary aliphatic amines, such as, dimethyl amine, diethyl amine, dipropylamine, dibutylamine; substituted aliphatic amines, and aralkylamines; such as chloroethylamine, phenethylamine, benzylamine; aryl amines, aniline, alphanaphthylamine, betanaphthylamine; substituted arylamines, m-toluidine, p-benzylaniline; secondary mixed aliphatic-aromatic amines, such as N-allylaniline, benzylaniline; cyclic amines, piperidine, morpholine; heterocyclic amines, aminopyrimidine; diamines, butylenediamine, and ethylenediamine. The acids suitable for reaction in the instant amide formation are organic carboxylic acids, capable of forming an amide with an amine, illustratively, aliphatic acids, acetic, propionic, butyric, lauric, oleic, glycollic, citric, lactic, glutaric, maleic, succinic, dimethylacetic, heptanoic, beta-cyclopentylpropionic, cholic, monochloracetic, dichloracetic, trichloracetic, acetoacetic, beta-acetylpropionic; aryl acids, benzoic, 2-methylbenzoic, 2-methoxybenzoic, salicyclic; parahydroxybenzoic, para-aminobenzoic, aralkylacid, betanaphthoic, phthalic; phenylacetic, cinnamic, betaphenylpropionic; heterocyclic acids, furoic and beta-pyridinecarboxylic. In the event that cysteine is selected for condensation with amine by the instant process, it is desirable that the sulfhydryl group be first blocked by benzylation. As recognized in the art, where reactive side chain substituents occur, and if desired, are to be protected, they may be blocked, in the case of amino by carbobenzoxylation, carboxyl by esterification to methyl or benzyl esters, and hydroxyl by acetylation or carbobenzoxylation.

Reaction of amines and acids to form amides are of course most readily effected in the solution state, however either the amine or the acid may be undissolved or in a different phase and reactions are effected between undissolved solids functioning as acids and amines as illustrated by the treatment of wool, felt and leather with carbodiimide in accordance with this invention.

The carbodiimides of the present invention may be employed in the treatment of protein materials such as animal hides, animal fibers, polypeptide fibers such as silk, wools, furs and hair, feathers, casein, zein, soy protein, gliadin, egg albumen, lactalbumen, gelatin, and the like. The use of the carbodiimides to form amide bonds has the general effect of increasing the molecular size of the protein treated whether it be that contained in hides, furs, feathers or the extracted protein such as casein, albumens, zein, gelatin and the like. This increase in molecular weight usually involves the formation of cross linkages, especially in the case of the fibrous proteins although to a lesser extent in the case of the globular proteins. In the treatment of proteins with carbodiimide in accordance with this invention, it is now practical to avoid, if desired, the introduction of new reactants into the protein and at the same time the proteins are modified but retain their characteristic antigenicity. Thus virus cultures and bacteria are completely inactivated by carbodiimide but show the characteristic antigenicity of their native protein upon injection into an animal.

Advantage can be taken of these general effects in the treatment of hides to cause hardening or tanning.

In such a case no fragment is left in the hide as in the case of using chrome alum, tannin, formaldehyde and like agents employed today. Such treatment with a carbodiimide is usually desirably preceded by a treatment designed to make available an increased number of carboxyl groups. In most cases there are an adequate number of amino groups available for the reaction so that no pretreatment for this purpose is required. These are generally regarded as being provided principally by the terminal amino group of lysine. Such side amide groups are supplied by glutamic and aspartic acid units in the protein structure. Swelling, softening, penetrating or surface active agents can be employed to increase depth of effect.

Protein fibers such as hair, furs, silk, wools and the like may be treated with the carbodiimides of the present invention to impart dimensional stability, including resistance to shrinking, hardness, increased tensile strength and the like. This treatment of fibers can also be preceded advantageously by such pretreatments as those described above in connection with hides.

Both hides and animal fibers can be treated in accordance with the invention to increase water repellency or resistance and wet strength. In such a case softening or swelling pretreatment offers little advantage but treatment to provide an increased number of free carboxyl groups at the surface of the hide or fiber is advantageous.

It is also possible as indicated above to treat extracted proteins such as casein, zein, gliadin, soy protein, soy albumen, egg albumen, lactalbumen, gelatin and the like. In the case of casein the result is the formation of high polymers useful in the production of molded or extruded plastic articles or in paints where enamel or hard surfaces are desired. In the case of gelatin the carbodiimides of the present invention may be used to increase molecular weight of jellying power usually expressed in terms of Bloom and they may also be used to harden or otherwise modify the gelatin for photographic purposes, e.g., a 5% solution of gelatin in water to which was added an amount of 1-cyclohexyl-3-[2-morpholinyl-(4)-ethyl] carbodiimide metho-p-toluene-sulfonate equal in weight to the gelatin set to a gel in 60 seconds and after 13 minutes had hardened to the point where it could not be melted at steam-bath temperatures.

The gelatin of this invention is readily distinguishable from collagen or gelatin as heretofore known. Collagen is not water-soluble as compared with gelatin. Both collagen and prior art gelatin contain lysine in combined form as part of the protein, but with free aminonitrogen, principally ε-amino, analysis of about 0.64 percent. Deaminated gelatin in which the amino groups have been removed and the amino acids thus altered are known. The instant fully modified gelatin contains all of its original amino acid content but with no added residues derived from conventional hardening agents; such as, for example, aldehydes (formaldehyde or glyoxal) and metallic salts (chrome alum), and include a lysine content of about 4 percent, but with a Van Slyke free amino-nitrogen analysis of less than about 95 percent of the Van Slyke free amino-nitrogen analysis of the corresponding untreated gelatin. This modified gelatin which has a Van Slyke free amino-nitrogen analysis of about 95 percent less than the Van Slyke free amino-nitrogen analysis of the corresponding untreated gelatin possesses increased viscosity in aqueous dispersion and is productive of higher melting point gels at a particular concentration than is effected with ordinary gelatin. A lower viscosity modified gelatin, without having a reduction in molecular weight or degradation, is effected by the modified gelatins having a Van Slyke free amino-nitrogen analysis of less than about 25 percent of the Van Slyke free amino-nitrogen analysis of the corresponding untreated gelatin. Thus, substantially all of the free amino group content and carboxyl content of a gelatin may be condensed by this invention or only a relatively small portion of the free amino group content and carboxyl content of a gelatin may be condensed. The proportion of the free amino group content and carboxyl group content of a gelatin condensed may be controlled to obtain a modified gelatin having a particular melting point or other desired property. The degree of modification of the gelatins modified by this invention may be determined, in addition to a Van Slyke free amino-nitrogen content before and after modification, by reaction with 2,4-dinitrofluorobenzene (Sanger's reagent) followed by total hydrolysis and measurement of free lysine. Thus, the modified gelatin having a Van Slyke free amino-nitrogen analysis of less than about 95 percent of the Van Slyke free amino-nitrogen analysis of the corresponding untreated gelatin, when so tested, has an acylated lysine ε-amino content of about 5 percent.

The carbodiimides of the present invention not only provide increased molecular weight by linear combination or end to end linkages to increase the length of the protien molecule, but the carbodiimides also serve to cause cross linking between adjacent protein chains. It is particularly advantageous that the carbodiimides provide both types of linking since this, in turn, provides maximum effect with respect to tanning hides, fixing fibers, hardening proteins and the like.

The carbodiimides of the present invention may be employed in the preparation of pharmaceutical or biologically active compounds or materials. For example, gramicidin-S, which is a macrocyclic peptide antibiotic containing ten amino acid units in a thirty-membered ring, could be prepared using the carbodiimides both in building up the ten amino acid unit chain and in the final cyclization. Similarly, peptide hormones such as those of the pituitary gland termed vasopressin and oxytocin may also be prepared using the carbodiimides of the present invention.

In accordance with this invention directed to the formation of amide linkages as described in detail, those having particular utility are the water-soluble aliphatic carbodiimides. These and their preparation have been exemplified. They are novel and possessed of especial advantage in that the amide linkages may be formed in aqueous media and most amino acids, peptides and proteins are most soluble or compatible in such media. Also, such carbodiimides result in water-soluble ureas which are most easily removed from the reaction mixture or otherwise separated from the product containing the newly formed amide linkage. Surprisingly, such carbodiimides "dehydrate" the carboxyl and amino groups involved in the reaction and do so in aqueous media.

Detailed procedures for preparing carbodiimides typical of those of the present invention are set forth below:

Example 1

*1-cyclohexyl-3-[2-morpholinyl-(4)-ethyl] thiourea.*—A solution of 19.4 g. (0.138 mole) of cyclohexylisothiocyanate [A. Skita and H. Rolfes, Ber., 53B, 1242 (1920)], and 18.0 g. (0.138 mole) of N-(2-aminoethyl)-morpholine in 500 ml. of ether was heated under reflux for 10 minutes. On cooling, the crystalline thiourea which separated amounted to 36.0 g. (96%), M.P. 128–129° C.

Example 2

A portion was recrystallized from acetone-ligroin, M.P. 128–129° C.

*1-cyclohexyl-3-[2-morpholinyl-(4)-ethyl carbodiimide.*—A mixture of 40 g. (0.0147 mole) of 1-cyclohexyl-3-[2-morpholinyl-(4)-ethyl] thiourea and 6.0 g. of mercuric oxide (Merck yellow) in 50 ml. of acetone was heated (magnetic stirrer) under reflux for 6 hours. The mercuric sulfide formed, was removed by filtration, a second 6 g. portion of mercuric oxide was added, and the suspension was heated at reflux for another 6 hours. The reaction mixture was again filtered and the filtrate concentrated under reduced pressure. The oily residue was evaporatively distilled at 140° C./0.2 mm.; yield 2.4 g. (70%).

*Analysis.*—Calcd for $C_{13}H_{22}N_2O$: C, 65.78; H, 9.77; N, 17.71. Found: C, 65.60; H, 9.59; N, 17.71.

Example 3

*1-cyclohexyl-3-[2-morpholinyl-(4)-ethyl]-carbodiimide metho-p-toluenesulfonate.*—A mixture of 0.5 g. (2.1 mmoles) of 1-cyclohexyl-3-[2-morpholinyl-(4)-ethyl] carbodiimide and 0.39 g. (2.1 mmole) of methyl p-toluenesulfonate was heated on a steam bath for 20 minutes. A solution in benzene of the reaction mixture deposited the crystalline quaternary salt, 0.6 g. (68%), M.P. 113–115° C.

*Analysis.*—Calcd. for $C_{21}H_{33}O_4N_3S$: C, 59.57; H, 7.80; N, 9.93. Found: C, 59.58; H, 8.05; N, 9.88.

In a second experiment the reaction product was not distilled but was used directly in the preparation of the quaternary salt with an overall yield of 70%.

Example 4

*1-cyclohexyl-3-(4-diethylaminocyclohexyl) thiourea.*—After heating under reflux for 15 minutes a solution of 5.0 g. (0.029 mole) of N,N-diethyl-1,4-cyclohexyldiamine and 4.2 g. (0.03 mole) of cyclohexylisothiocyanate in 10 ml. of ether was evaporated under reduced pressure. Crystallization of the residue from warm ligroin and recrystallization from an acetone-ligroin mixture afforded 7.2 g. (80%), M.P. 139–141° C., of the pure thiourea.

*Analysis.*—Calcd. for $C_{17}H_{33}N_3S$: C, 65.59; H, 10.61; N, 13.50; S, 10.28. Found: C, 65.65; H, 10.66; N, 13.60; S, 10.36.

Example 5

*1-cyclohexyl-3-(4-diethylaminocyclohexyl) carbodiimide.*—A suspension of 2.0 g. of mercuric oxide in 20 ml. of acetone containing 0.8 g. (0.003 mole) of 1-cyclohexyl-3-(4-diethylaminocyclohexyl) thiourea was refluxed for 20 hours. The mercuric sulfide formed was removed by filtration, the filtrate was concentrated under reduced pressure, and the residue was evaporatively distilled at 140° C./0.03 mm., 0.6 g. (84%).

*Analysis.*—Calcd. for $C_{17}H_{31}N_2$: C, 75.59; H, 11.26; N, 15.15. Found: C, 73.19; H, 11.30; N, 15.29.

Example 6

*1-cyclohexyl-3-(4-diethylaminocyclohexyl) carbodiimide metho-p-toluenesulfonate.*—A solution of 0.3 g. (1.1 mmole) of 1-cyclohexyl-3-(4-diethylaminocyclohexyl) carbodiimide and 0.21 g. (1.1 mmole) of methyl p-toluenesulfonate in 6 ml. of benzene (sodium dried) was heated under reflux on a steam bath for 20 minutes. After storage overnight at room temperature, the solvent was evaporated to dryness under reduced pressure. The hygroscopic residue, amounting to 0.51 g. (100%), was analyzed without further purification.

*Analysis.*—Calcd. for $C_{25}H_{41}N_3O_3S$: C, 64.78; H, 8.85; N, 9.07. Found: C, 64.58; H, 8.71; N, 9.14.

Example 7

*1,3-di-(4-diethylaminocyclohexyl) thiourea.*—A solution of 2.3 ml. (0.03 mole) of carbon disulfide in 4 cc. of methanol was added slowly to a cold solution of 2.0 g. (0.012 mole) of N,N-diethyl-1,4-cyclohexyldiamine in 20 ml. of methanol. As the addition progressed a solid separated. This suspension was heated under reflux for 2 days during which time solution was effected. The reaction mixture was evaporated to dryness under reduced pressure, and the residue was recrystallized twice from ligroin (B.P. 90–100° C.), yielding 0.8 g. (35%), M.P. 164–165° C.

*Analysis.*—Calcd. for $C_{21}H_{42}N_4S$: C, 65.97; H, 11.00; N, 14.55; S, 8.36. Found: C, 65.80; H, 11.22; N, 14.74; S, 8.33.

Example 8

*1,3-di-(4-diethylaminocyclohexyl) carbodiimide.*—A mixture of 2.4 g. of mercuric oxide and 0.95 g. (2.5 mmoles) of 1,3-di-(4-diethylaminocyclohexyl) thiourea in 30 cc. of acetone was heated with stirring under reflux for 1 hour. The filtered reaction mixture was concentrated under reduced pressure and the residue was evaporatively distilled at 180° C./0.03 mm., 0.575 g. (66%).

*Analysis.*—Calcd. for $C_{21}H_{40}N_4$: C, 72.36; H, 11.57; N, 16.08. Found: C, 72.25; H, 11.50; N, 16.34.

Example 9

*1-cyclohexyl-3-(β-diethylaminoethyl) carbodiimide.*—A solution of 7.0 g. (0.05 mole) of cyclohexylisothiocyanate [A. Skita and H. Rolfes, Ber., 53B, 1242 (1920)], and 5.8 g. (0.05 mole) of N,N-diethylethylene diamine in ether was heated under reflux for 10 minutes. The ether was evaporated to dryness under reduced pressure, leaving a yellow oil, weight 12.8 g.

A portion of the thiourea (5 g.) was dissolved in 75 cc. of acetone containing 7.2 g. of mercuric oxide (Merck yellow). The reaction solution was stirred and heated under reflux for 5 hours. The mercuric sulfide was removed by filtration and an additional 7.0 g. of mercuric oxide was added followed by an overnight reflux period. After evaporation of the solvent, the residual oil was purified by evaporation distillation at 100° C./0.05 mm.; yield, 12 g.

*Analysis.*—Calcd. for $C_{13}H_{25}N_3$: C, 69.90; H, 11.28; N, 18.81. Found: C, 69.91; H, 11.24; N, 18.75.

Example 10

*1-ethyl-3-[2-morpholinyl-(4)-ethyl] thiourea.*—Ethylisothiocyanate (25.0 g.; 0.287 mole) was added slowly with stirring to a solution of 37.4 g. (0.287 mole) of aminoethylmorpholine (Carbide and Carbon) in 400 ml. of dry ether. The product crystallized from the solution during the addition. After an additional 2 hours of stirring at room temperature the product was collected. The yield was 56.0 g. (90%), M.P. 94.5–96.0° C.

Example 11

*1-ethyl-3-[2-morpholinyl-(4)-ethyl] carbodiimide.*—A mixture of 54.2 g. (0.25 mole) of 1-ethyl-3-[2-morpholinyl-(4)-ethyl] thiourea and 54.0 g. (0.25 mole) of freshly-dried mercuric oxide (Merck yellow) in 500 ml. of dry acetone was stirred at room temperature for 12 hours. The mercuric sulfide which formed was removed by filtration. This process was repeated with two 27.0-g. portions of mercuric oxide, the final mixture being treated with activated carbon before filtration. The colorless filtrate was concentrated under reduced pressure to a pale orange oil, 42.1 g. (92%).

Flash distillation through a short-path still (oil bath 135° C.; 0.2 mm.) gave 22.625 g. (50%) of colorless carbodiimide; $n_D^{25}$ 1.4944;

$$d_{25}^{25} 1.0235$$

Example 12

*1 - ethyl - 3 - [2 - morpholinyl-(4)-ethyl] carbodiimide metho-p-toluenesulfonate.*—A mixture of the basic carbodiimide (3.27 g.; 0.018 mole) and methyl p-toluenesulfonate (3.32 g.; 0.018 mole) was heated with constant swirling on a steam bath for 5 minutes. The resulting viscous, orange oil was crystallized from acetone-benzene to 4.2 g. (64%) of colorless quaternary carbodiimide, M.P. 91.5–92.5° C.

Example 13

*1-ethyl - 3 - [2-morpholinyl-(4)-ethyl] carbodiimide.*—Two grams (0.0098 mole) of 1-ethyl-3-[2-morpholinyl-(4)-ethyl] urea (from ethyl isocyanate and the amine) and 3.82 g. (0.02 mole) of p-toluenesulfonyl chloride were mixed slowly with 5.5 ml. pyridine (reagent) in 20 ml. dry methylene chloride with stirring at 0° C. The resulting yellow solution was refluxed gently for a period of 4 hours with stirring.

The solution was then added slowly to 20 g. of ice and 2 g. of sodium carbonate. Additional sodium carbonate was added as the mixture was added to the ice, so that at all times the pH of the solution was somewhat above 7. The final pH of the mixture was 8. The product was immediately extracted with three 30-ml. portions of methylene chloride. This extract was filtered through sodium sulfate and dried over sodium sulfate.

The solvent was removed by warming at 2 mm. Hg. The residual orange oil was distilled with $N_2$ ebullition at 1.5 mm., B.P. 100–105° C., yield 0.37 g., 20% of the colorless product, 1-ethyl - 3 - [2-morpholinyl-(4)-ethyl] carbodiimide.

Example 14

*1-ethyl-3-[2-morpholinyl-(4)-ethyl] carbodiimide hydrochloride.*—To a cooled (0–5° C.) solution of the basic carbodiimide, 1-ethyl-3-[2-morpholinyl-(4)-ethyl] carbodiimide (3.27 g.; 0.018 mole), in 20 ml. of anhydrous ether was added slowly 0.017 mole of hydrogen chloride in 10 ml. of ether. After removal of solvent the water-soluble carbodiimide salt, 1-ethyl-3-[2-morpholinyl-(4)-ethyl] carbodiimide hydrochloride, is used without further purification.

Example 15

*1-ethyl-3-[2-morpholinyl-(4)-ethyl] carbodiimide sulfate.*—To a cooled (0–5° C.) mixture of the basic carbodiimide, 1-ethyl-3-[2-morpholinyl-(4)-ethyl] carbodiimide (3.27 g.; 0.018 mole), and 20 ml. of water was added 0.017 mole of N-sulfuric acid. The solution was immediately lyophilized. The resulting semi-solid, 1-ethyl-3-[2-morpholinyl-(4)-ethyl] carbodiimide sulfate, is used for amide condensations without further purification. Alternatively, the aqueous solution prepared is used to effect the cross-linking of gelatin.

Example 16

*1,3 - di - (γ - diethylaminopropyl) carbodiimide.*—Five grams of 1,3-di-(γ-diethylaminopropyl) urea (from the corresponding amine and urea) and 9 g. of p-toluenesulfonyl chloride were mixed slowly with 12 ml. of pyridine and 60 ml. of dry methylene chloride with stirring at 0° C. After a reflux period of 6 hours the cooled solution was poured onto 60 g. of ice and 7 g. of potassium carbonate. Additional potassium carbonate was added to maintain the pH at 8. The product was extracted with four portions of methylene chloride and the dried (sodium sulfate) extract was concentrated under reduced pressure. The 1,3-di-(γ - diethylaminopropyl) carbodiimide can be used without further purification. The yield is 25%.

Example 17

*1 - ethyl-3-(γ - dimethylaminopropyl) carbodiimide.*—Two grams of 1-ethyl-3-(γ-dimethylaminopropyl) urea (from ethyl isocyanate and N,N-dimethyl-1,3-propanediamine) and 3.5 g. of p-toluenesulfonyl chloride were added slowly to 5 ml. of pyridine in 30 ml. of dry methylene chloride with stirring at 0° C. After a 4-hour reflux period the cooled solution was added slowly to a mixture of 20 g. of ice and 2 g. of sodium carbonate. Additional sodium carbonate was added to maintain the pH of the solution at 8. The layers were separated and the organic extract was dried over sodium sulfate and the solvent under reduced pressure. The 1-ethyl-3-(γ-dimethylaminopropyl) carbodiimide may be used directly or may be purified by distillation at 1 mm. The yield is 30%.

Example 18

*Phthaloylglycylglycine ethyl ester.*—To a solution of 0.18 g. (0.865 mmole) of phthaloylglycine and 0.088 g. (0.865 mmole) of glycine ethyl ester in 6 ml. of water was added 0.4 g. (0.86 mmole) of 1-cyclohexyl-3-(4-diethylaminocyclohexyl) carbodiimide metho p-toluenesulfonate. A solid began to separate after 10 minutes of stirring and after 2 hours the solid, phthaloylglycylglycine ethyl ester, was collected, weight 0.18 g. (75%); M.P. 194–195° C.

The aqueous phase was evaporated at a temperature of 30° C. to remove water and leave a residue of the corresponding urea which was regenerated into the carbodiimide following the procedure of Amiard, G. and Heymes, R., Bull. Soc. Chim. France, 1360 (1956).

Example 19

*Phthaloyl-L-threonine.*—To a solution of 4.54 g. (0.0306 mole) phthalic anhydride in 25 ml. of dry dioxane, there was added 3.04 g. (0.0255 mole) of L-threonine. The heterogeneous mixture was submerged in an oil bath at 105° C. and stirred vigorously for 5 hours. After evaporation of the solvent under reduced pressure, the phthaloyl-L-threonine crystallized from acetone-water; yield, 6.0 g. (94%), M.P. 135–140° C. A portion of the product was recrystallized twice from ethanol-water, M.P. 143–144° C., $[\alpha]^{26.0}$ D —36.7° (0.0480 g. in 1.5 ml. absolute ethanol).

*Analysis* Calcd. for $C_{12}H_{11}NO_5$: C, 57.80; H, 4.44; N, 5.61. Found: C, 58.06; H, 4.75; N, 5.54.

*Phthaloyl-L-threonyl-L-phenylalanine methyl ester.*—To a solution of 0.350 g. (0.0014 mole) of phthaloyl-L-threonine in 6 ml. of purified methylene chloride, there was added freshly prepared L-phenylalanine methyl ester (0.500 g., 0.0028 mole) (prepared by neutralizing an aqueous solution of L-phenylalanine methyl ester hydrochloride to pH 9.0 with potassium carbonate and subsequent extraction into ether; the hydrochloride was prepared by Fischer esterification) and N,N'-dicyclohexylcarbodiimide [E. Schmidt, F. Hitzler and E. Lahde, Ber., 71, 1933 (1938)] (0.290 g. 0.0014 mole). A precipitate of N,N'-dicyclohexylurea formed immediately, but the reaction was allowed to proceed for 5 hours at room temperature.

The urea was removed by filtration and the methylene chloride solution was extracted successively with N hydrochloric acid, N potassium bicarbonate and water. After drying and subsequent removal of the solvent, the residue was crystallized from acetone-ether, yielding a total of 0.520 g. (91%) of product; M.P. 149–152° C. An analytical sample was obtained after two recrystallizations from acetone-ether, M.P. 153–154° C., $[\alpha]^{27}$ D +1.93° (0.0986 g. in 1.5 ml. of dimethylformamide).

*Analysis.*—Calcd. for $C_{22}H_{23}N_2O_6$: C, 64.38; H, 5.40; N, 6.83. Found: C, 64.63; H, 5.65; N, 7.11.

Example 20

*Phthaloyl-L-threonyl-L-leucine benzyl ester.*—To a solution of 0.600 g. (0.00241 mole) of phthaloyl-L-threonine in 10 ml. of distilled acetonitrile, there was added L-leucine benzyl ester [prepared by neutralizing an aqueous solution of L-leucine benzyl ester hydrochloride to pH 9.0 with potassium carbonate and subsequent extraction into ether. The hydrochloride was synthesized according to the procedure of H. K. Miller and H. Waelsch, J. Am. Chem. Soc., 74, 1092 (1952)]. (0.810 g., 0.0036 mole) and N,N'-dicyclohexylcarbodiimide (0.495 g., 0.00241 mole).

The reaction was carried out as described for phthaloyl-L-threonyl-L-phenylalanine methyl ester. After the acetonitrile was removed by distillation under reduced pressure, the residue was taken up in ethyl acetate and extracted with acid, bicarbonate and water. After drying and removal of the solvent the residue was crystallized from acetonitrile-water yielding 0.980 g. (89%); M.P. 103–106° C. Two recrystallizations from acetone-ether-hexane yielded an analytical sample; M.P. 109–110° C., $[\alpha]^{26}$ D —16.7° (0.0770 g. in 1.5 ml. absolute ethanol).

*Analysis.*—Calcd. for $C_{25}H_{29}N_2O_6$: C, 66.36; H, 6.24; N, 6.19. Found: C, 66.14; H, 6.25; N, 6.32.

Example 21

*Phthaloyl-L-threonyl-L-phenylalanine.*—To a solution of 0.840 g. (0.00205 mole) of phthaloyl-L-threonyl-L-phenylalanine methyl ester in 30 ml. of acetone there was added 10 ml. of water and 5 ml. of concentrated hydrochloric acid. The solution was refluxed for two and a half hours and the acetone removed by distillation. Ethyl acetate was added and the product was subsequently extracted into bicarbonate solution. After acidification and re-extraction into ethyl acetate, drying and removal of the solvent under reduced pressure, the product was obtained as a crystalline mass. Recrystallization from ethanol-water yielded 0.510 g. (54%) of analytically pure material; M.P. 207–208° C., $[\alpha]^{27}$ D +23.2° (0.025 g. in 1.5 ml. absolute ethanol).

*Analysis.*—Calcd. for $C_{21}H_{20}N_2O_6$: C, 63.60; H, 5.09; N, 7.07. Found: C, 63.30; H, 5.16; N, 7.13.

*Phthaloyl - L - threonyl-L-phenylalanyl-L-phenylalanine methyl ester.*—A mixture of 0.200 g. (0.00051 mole) of phthaloyl - L - threonyl-L-phenylalanine, L-phenylalanine methyl ester (0.110 g., 0.00062 mole) and N,N'-dicyclohexylcarbodiimide (0.105 g., 0.00051 mole) in methylene chloride was allowed to react as described for phthaloyl-L-threonyl-L-phenylalanine methyl ester.

The recrystallized product (ethanol-water) amounted to 0.245 g. (92%); M.P. 147.2–148° C.; $[\alpha]^{27}$ D —25.6° (0.0271 g. in 1.5 ml. of absolute ethanol)

*Analysis.*—Calcd. for $C_{31}H_{32}N_3O_7$: C, 66.77; H, 5.60; N, 7.54. Found: C, 66.71; H, 5.86; N, 7.48.

Example 22

*O-acetyl-L-serine.*—A solution of 3.5 g. (0.0286 mole) of L-serine in 150 ml. of glacial acetic acid was saturated with hydrogen chloride at 0° C. The mixture was stored for fifteen hours at room temperature, and the solvent removed under reduced pressure. After repetition of this process, the O-acetyl-L-serine hydrochloride was crystallized from ethanol-ether, yielding 5.20 g. (99%); d. 150° C., $[\alpha]^{27}$ D—7.4° (0.0334 g. in 1.5 ml. absolute ethanol). To a solution of 3.0 g. (0.0163 mole) of this product in ethanol there was added 162 g. (0.0160 mole) of triethylamine. The resulting O-acetyl-L-serine was recrystallized from water-ethanol, 2.42 g. (98%); d. 167–168° C., $[\alpha]^{27}$ D +9.15° (0.0268 g. in 1.5 ml. 0.1 N hydrochloric acid).

*Analysis.*—Calcd. for $C_5H_9NO_4$: C, 40.82; H, 6.12; N, 9.51. Found: C, 40.92; H, 6.41; N, 9.39.

*Phthaloyl-O-acetyl-L-serine.*—To a solution of phthalic anhydride (2.0 g., 0.0135 mole) in 20 ml. of dry dioxane, there was added 1.65 g. (0.0112 mole) of O-acetyl-L-serine. The heterogeneous mixture was submerged in an oil bath at 95° C. and stirred vigorously for 12 hours. The dioxane solution was lyophilized. The resulting oil was taken up in ether-chloroform mixture (3:1) and filtered. The solution was chromatographed on a 100 g. silica gel column (Davison-Silica-gel, lot No. 923–08–08–226, 100–200 mesh), previously washed with ether, then with ether-chloroform (3:1). The crystalline product, 1.93 g. (63%) emerged with the solvent front; M.P. 140–147° C. A portion of this material was recrystallized from ethanol-water for analysis; M.P. 151–153° C., $[\alpha]^{27}$ D —63.1° (0.0363 g. in 1.5 ml. absolute ethanol).

*Analysis.*—Calcd. for $C_{12}H_{11}NO_6$: C, 56.32; H, 4.00; N, 5.05. Found: C, 56.39; H, 3.85; N, 5.04.

*Phthaloyl-O-acetyl-L-seryl - L - phenylalanine methyl ester.*—A methylene chloride solution of 0.400 g. (0.00145 mole) of phthaloyl-O-acetyl-L-serine, L-phenylalanine methyl ester (0.310 g., 0.00165 mole) and N,N'-dicyclohexylcarbodiimide (0.300 g., 0.0014 mole) was allowed to react as described for phthaloyl-L-threonyl-L-phenylalanine methyl ester.

Recrystallization from ethanol-water afforded a total of 0.570 g. (89%); M.P. 131–132° C., $[\alpha]^{27}$ D +14.7° (0.0395 g. in 1.5 ml. of absolute ethanol).

*Analysis.*—Calcd. for $C_{22}H_{22}N_2O_7$: C, 63.01; H, 5.06; N, 6.39. Found: C, 63.21; H, 5.34; N, 6.44.

Example 23

*Carbobenzoxy-L-hydroxyprolyl-L-phenylalanine methyl ester.*—A solution of carbobenzoxy-L-hydroxyproline [J. S. Fruton, J. Biol. Chem., 146, 463 (1942)] (0.8 g., 0.0032 mole), L-phenylalanine methyl ester (0.54 g., 0.0032 mole), and N,N'-dicyclohexylcarbodiimide (0.625 g., 0.0033 mole) in methylene chloride was treated as described for phthaloyl-L-threonyl-L-phenylalanine methyl ester. Crystallization occurred from an ethyl acetate solution; yield, 1.1 g. (86%), M.P. 108–112° C. A portion of the material was recrystallized from acetone-ether-hexane; M.P. 114–115° C., $[\alpha]^{27}$ D —29.2° (0.0416 g. in 1.5 ml. absolute ethanol).

Analysis.—Calcd. for $C_{23}H_{26}N_2O_6$: C, 64.78; H, 6.10; N, 6.57. Found: C, 64.76; H, 6.36; N, 6.60.

Example 24

Phthaloylglycylglycine ethyl ester—Run (a).—To a suspension of 0.21 g. (1.46 mmole) of glycine ethyl ester hydrochloride in 4 ml. of dry dioxane was added 0.38 g. (1.56 mmole) of 1-cyclyhexyl-3-[2-morpholinyl-(4)-ethyl] carbodiimide followed by 0.36 g. (1.46 mmole) of phthaloylglycine. The mixture was stirred overnight after which the dioxane was distilled under reduced pressure. The residue was dissolved in ethyl acetate and this solution was washed first with 6 ml. of 1 N hydrochloric acid followed by 6 ml. of 1 N potassium bicarbonate. The ethyl acetate layer was dried over magnesium sulfate then evaporated to dryness. The residue, after crystallization from ethanol, weighed 0.33 g. (80%); M.P. 191–193° C. A mixed melting point with authentic material was not depressed.

Run (b).—The procedure given above was followed using a mixture of 5 ml. of dioxane and 1 ml. of water as the solvent. The other quantities were: 0.21 g. (1.46 mmole) of glycine ethyl ester hydrochloride, 0.43 g. (1.56 mmole) of N-cyclohexyl-N'-(4-diethylaminocyclohexyl) carbodiimide and 0.3 g. (1.46 mmole) of phthaloylglycine. The product weighed 0.24 g. (83%); M.P. 193–195° C.

Run (c).—To a solution of 0.18 g. (0.865 mmole) of phthaloylglycine and 0.088 g. (0.865 mmole) of glycine ethyl ester in 6 ml. of water was added 0.4 g. (0.86 mmole) of the methyl p-toluenesulfonate salt of N-cyclohexyl-N'-(4-diethylaminocyclohexyl) carbodiimide. A solid began to separate after 10 minutes of stirring and after 2 hours the solid was collected, weight 0.18 g. (75%); M.P. 194–195° C.

Run (d).—The procedure given in Run (a) was followed using dioxane as the solvent, 24.7 mg. (0.29 mmole) of glycine ethyl ester hydrochloride, 59.0 mg. (0.29 mmole) of phthaloylglycine and 0.1 g. (0.29 mmole) of 1,3-di-(4-diethylaminocyclohexyl) carbodiimide. The yield was 50 mg. (86%); M.P. 192–194° C.

Example 25

Phthaloyl-L-phenylalanylglycine ethyl ester—Run (a).—The experimental procedure described above for the preparation of phthaloylglycylglycine [Example 24, Run (a)] was followed using 0.196 g. (1.4 mmole) of glycine ethyl ester hydrochloride, 0.4 g. (1.7 mmole) of N-cyclohexyl-N'-[2-morpholinyl-(4)-ethyl] carbodiimide and 0.415 g. (1.4 mmole) of phthaloyl-L-phenylalanine. Recrystallization of the product from ethanol yielded 0.43 g. (81%); M.P. 160–161° C., $[\alpha]^{26}$ D —146° [ethanol]. The product corresponded in rotation and melting point with an authentic sample [J. C. Sheehan, D. W. Chapman and Roy W. Roth, J. Am. Chem. Soc., 74, 3822 (1952)].

Run (b).—To a solution of 0.196 g. (1.4 mmole) of glycine ethyl ester hydrochloric and 0.41 g. (1.5 mmole) of N-cyclohexyl-N'-(4)-diethylaminocyclohexyl carbodiimide in 6 ml. of dioxane was added, with stirring, 0.45 g. (1.4 mmole) of phthaloyl-L-phenylalanine. The resulting reaction mixture was worked up as described above and afforded 0.49 g. (90%); M.P. 160–161° C.; $[\alpha]^{26}$ D —146° [ethanol].

Run (c).—The reactant amounts given in Run (b) were used along with a mixture of 2 ml. of water and 6 ml. of dioxane as the solvent. The product weighed 3.39 g. (71%); M.P. 160–161° C., $[\alpha]^{26}$ D —146° [ethanol].

Run (d).—This experiment was carried out as described in Run (a) using dioxane, 0.196 g. (1.4 mmole) of glycine ethyl ester hydrochloride, 0.38 g. (1.7 mmole) of N-cyclohexyl-N-(β-diethylaminoethyl) carbodiimide and 0.415 g. (1.4 mmole) of phthaloyl-L-phenylalanine. Recrystallization from ethanol yielded 0.11 g. (20%) of product; M.P. 160–161° C.; $[\alpha]^{26}$ D —146° [ethanol].

Example 26

Phthaloyl-L-phenylalanyl-L-leucine ethyl ester—Run (a).—The experimental procedure described for phthaloyl-L-glycylglycine ethyl ester [Run (a)] was followed using 0.27 g. (1.36 mmole) of L-leucine ethyl ester hydrochloride, 5 ml. of dioxane, 0.39 g. (1.4 mmole) of N-cyclohexyl-N'-(4)-diethylaminocyclohexyl carbodiimide and 0.4 g. (1.36 mmole) of phthaloyl-L-phenylalanine; yield, 0.5 g. (87%); M.P. 108–109° C.; $[\alpha]^{26.0}$ D —115° [ethanol]. The mixed melting point with an authentic sample did not show depression.

Run (b).—This process was carried out as above with the variation that 2 cc. of water was added to the initial reaction mixture; yield, 50%.

Example 27

Carbobenzoxyglycyl-L-phenylalanylglycine ethyl ester.—The experimental procedure given in Run (a) above was followed using 0.12 g. (0.85 mmole) of glycine ethyl ester hydrochloride, 3 ml. of dioxane, 0.24 g. (0.85 mmole) of 1-cyclohexyl-3-(4-diethylaminocyclohexyl) carbodiimide and 0.3 g. (0.85 mmole) of carbobenzoxyglycyl-L-phenylalanine; yield, 0.3 g. (81%); M.P. 117–118° C.; $[\alpha]^{26.0}$ D —12.4° [ethanol] (reported: M.P. 116–118° C., $[\alpha]^{25}$ D —12°).

Example 28

Phthaloyl-L-phenylalanyl-L-phenylalanine methyl ester.—This reaction was carried out as described previously using 0.216 g. (1.0 mmole) of L-phenylalanine methyl ester hydrochloride, dry dioxane, 0.285 g. (1.1 mmole) of N-cyclohexyl-N'-(4-diethylaminocyclohexyl) carbodiimide and 0.295 g. (1.0 mmole) of phthaloyl-L-phenylalanine. The product was crystallized from an n-butyl ether-hexane mixture; yield, 0.4 g. (88%); M.P. 101–102° C.; $[\alpha]^{26}$ D —128° [ethanol].

Analysis.—Calcd. for $C_{27}H_{24}N_2OS$: C, 71.04; N, 5.30; N, 6.12. Found: C, 70.75; H, 5.54; N, 5.78.

Example 29

Phenylacetanilide via the quaternary carbodiimide, 1-ethyl-3-[2-morpholinyl-(4)-ethyl] carbodiimide metho-p-toluenesulfonate.—A solution of 0.184 g. (1.35 mmoles) of phenylacetic acid, 0.126 g. (1.35 mmoles) of aniline, and 0.50 g. (1.35 mmoles) of quaternary carbodiimide, 1-ethyl-3-[2-morpholinyl-(4)-ethyl] carbodiimide metho-p-toluenesulfonate, in 25 ml. of purified methylene chloride was heated under reflux overnight. A small quantity of the urea which had separated was removed by filtration (M.P. 182–183°) and the filtrate washed successively with 10 ml. portions of water, N hydrochloric acid, and N sodium bicarbonate. The dried (magnesium sulfate) solution was concentrated (aspirator) to yield 0.238 g. (83%) of phenylacetanilide, M.P. 116–118° C. The product was recrystallized from benzene-petroleum ether (B.P. 30–60° C.) to give colorless needles melting at 117.8–118.0° C.

Example 30

Phenylacetanilide via dicyclohexylcarbodiimide.—To a stirred solution of 0.33 g. (2.42 mmoles) of phenylacetic acid and 0.225 g. (2.42 mmoles) of aniline in 25 ml. of benzene was added 0.50 g. (2.42 mmoles) of N,N'- dicyclohexylcarbodiimide. The dicyclohexylurea formed in the reaction started to separate within a few seconds. After stirring overnight the urea was removed by filtration (M.P. 234.5–235.5° C.) and the filtrate washed successively with 10 ml. portions of N sodium bicarbonate and N hydrochloric acid. After drying over magnesium sulfate the solution was evaporated under reduced pressure. Crystallization of the residue from acetone-cyclohexane gave 0.357 g. (70%) of phenylacetanilide, M.P. 118.0–118.5° C.

Example 31

*N-formyl-β-naphthylamine.*—A solution of 0.194 g. (1.35 mmoles) of β-naphthylamine, 0.062 g. (1.35 mmoles) of anhydrous formic acid, and 0.50 g. (1.35 mmoles) of the quaternary carbodiimide, 1-ethyl-3-[2-morpholinyl-(4)-ethyl] carbodiimide metho-p-toluenesulfonate, in 20 ml. of purified methylene chloride was heated under reflux for 4 hours. The resulting pink solution was washed successively with 10 ml. of water, N hydrochloric acid and N sodium bicarbonate. Concentration afforded a crystalline residue, 0.190 g. (82%), M.P. 127.5–128.5° C. Recrystallization from methylene chloride-petroleum ether (B.P. 30–50° C.) gave colorless platelets melting at 129.5–130.5° C. (lit. M.P. 129° C.).

Example 32

*Trifluoroacetanilide.*—A solution of 0.155 g. (1.35 mmoles) of trifluoroacetic acid, 0.126 g. (1.35 mmoles) of aniline, and 0.50 g. of the quaternary carbodiimide, 1-ethyl-3-[2-morpholinyl-(4)-ethyl] carbodiimide metho-p-toluenesulfonate, in 25 ml. of purified methylene chloride was heated to reflux. After approximately 30 minutes the urea formed in the reaction started to separate. After 6 hours of reflux the mixture was cooled, the urea removed by filtration (M.P. 175–178.5° C.), and the filtrate washed with 10 ml. of water and 10 ml. of N hydrochloric acid. From the organic layer there was obtained a crystalline residue which was crystallized again from iso-octane. The yield was 0.215 g. (85%), M.P. 90.5–91.0° C.

*Analysis.*—Calcd. for $C_3H_6F_3NO$: C, 51.07; H, 3.22. Found: C, 51.72; H, 3.45.

Example 33

*Benzanilide.*—A solution of 0.165 g. (1.35 mmoles) of benzoic acid, 0.126 g. (1.35 mmoles) of aniline, and 0.50 g. (1.35 mmoles) of quaternary carbodiimide, 1-ethyl-3-[2-morpholinyl-(4)-ethyl] carbodiimide metho-p-toluenesulfonate, in 20 ml. of purified methylene chloride was heated under reflux for 15 hours. The resulting colorless solution was washed with successive portions of water, N hydrochloric acid and N sodium bicarbonate, and then concentrated (aspirator) to a crystalline residue; 0.135 g. (51%), M.P. 164–165° C.

Example 34

*N-[2-morpholinyl-(4)-ethyl] phenylacetamide.*—Aminoethylmorpholine (0.63 g.; 4.84 mmoles) was added to a solution of phenylacetic acid (0.66 g.; 4.84 mmoles) in 25 ml. of purified acetonitrile. In approximately 3 minutes the salt, morpholinoethylammonium phenylacetate, separated from solution. The mixture was heated (oil bath) with stirring to 50° C., at which temperature the salt redissolved. Dicyclohexylcarbodiimide (1.0 g.; 4.84 mmoles) was then added. Within 1 minute the dicyclohexylurea formed in the reaction started to separate from solution. Stirring was continued at this temperature for 13 hours. The urea was removed by filtration (M.P. 234–236° C.) and the filtrate concentrated to a yellow oil. This was dissolved in 15 ml. of benzene and the solution extracted with three 10 ml. portions of N hydrochloric acid. Solid sodium bicarbonate was added to the aqueous extracts till basic (ca. pH 8) and the resultant solution extracted with three 25 ml. portions of methylene chloride. The dried organic layer was concentrated under reduced pressure to a partially crystalline residue. Crystallization from acetone-water gave 0.207 g. (58%) of the amide, M.P. 82.5–84° C. A sample recrystallized for analysis from acetone-water melted at 82.5–83.5° C.

*Analysis.*—Calcd. for $C_{14}H_{20}N_2O_2$: C, 67.71; H, 8.12. Found: C, 67.86; H, 8.29.

Example 35

*N-cyclohexylphenylacetamide via the quaternary carbodiimide, 1-ethyl-3-[2-morpholinyl-(4)-ethyl] carbodiimide metho-p-toluenesulfonate.*—A solution of 0.203 g. (1.49 mmoles) of phenylacetic acid, 0.148 g. (1.49 mmoles) of cyclohexylamine, and 0.55 g. (1.49 mmoles) of quaternary carbodiimide, 1-ethyl-3-[2-morpholinyl-(4)-ethyl] carbodiimide metho-p-toluenesulfonate, in 50 ml. of purified methylene chloride was heated under reflux for 12 hours. The resulting colorless solution was concentrated (aspirator) to a volume of 20 ml. and washed successively with 10 ml. portions of water, N hydrochloric acid, and N sodium bicarbonate. The dried (magnesium sulfate) solution was concentrated under reduced pressure and the crystalline residue recrystallized from benzene-iso-octane. The yield was 0.10 g. (31%), M.P. 138.0–139.5° C.

Example 36

*N-cyclohexylphenylacetamide via the basic carbodiimide, 1-ethyl-3-[2-morpholinyl - (4) - ethyl] carbodiimide.*—To a solution of 0.38 g. (2.79 mmoles) of phenylacetic acid in 50 ml. of purified methylene chloride was added 0.277 g. (2.79 mmoles) of cyclohexylamine. The salt, cyclohexylammonium phenylacetate, separated immediately. The basic carbodiimide, 1-ethyl-3-[2-morpholinyl-(4)-ethyl] carbodiimide (0.512 g.; 2.79 mmoles) was added and the mixture heated under reflux for 9 hours. After an additional 48 hours at room temperature (stirring), the mixture was cooled and the unreacted salt removed by filtration (80 mg.; 12%). The filtrate was concentrated (aspirator) to dryness and the residue extracted with benzene. An additional 55 mg. (8.5%) of unreacted salt remained. The benzene solution was washed successively with two 10 ml. portions of N hydrochloric acid and 10 ml. of sodium bicarbonate. The dried (magnesium sulfate) solution was concentrated under reduced pressure to a crystalline residue which was recrystallized from benzene-petroleum ether (B.P. 30–60° C.) to give 0.150 g. (25%) of N-cyclohexylphenylacetamide, M.P. 137–138° C.

Example 37

*N-cyclohexylbenzamide via dicyclohexylcarbodiimide in acetone.*—Cyclohexylamine (0.24 g.; 2.42 mmoles) was added to a solution of benzoic acid (0.295 g.; 2.42 mmoles) in 25 ml. of acetone. The salt cyclohexylammonium benzoate separated immediately. Dicyclohexylcarbodiimide (0.50 g.; 2.42 mmoles) was added and the mixture stirred at room temperature for 13 hours. Nearly all of the material dissolved. The solvent was removed under reduced pressure. A benzene solution of the residue was concentrated gradually to give two crops, a total of 0.30 g. (38%), of N-benzoyl-N,N'-dicyclohexylurea, M.P. 166–167° C. A sample for analysis recrystallized from benzene-petroleum ether (B.P. 30–60° C.), melted at 166.0–166.5° C.

*Analysis.*—Calcd. for $C_{20}H_{28}N_2O_2$: C, 73.13; H, 8.59. Found: C, 73.02; H, 8.68.

The combined filtrates (above) were washed successively with 5 ml. of N bicarbonate and two 5 ml. portions of N hydrochloric acid. Petroleum ether was added gradually to the dried (potassium carbonate) benzene solution. An additional 70 mg. (9%) of acylurea (colorless needles) and 69 mg. (14%) of N-cyclohexylbenzamide (platelets), M.P. 149–150° C., were isolated.

Example 38

N-cyclohexylbenzamide via the quaternary carbodiimide, 1-ethyl-3-[2-morpholinyl-(4)-ethyl] carbodiimide metho-p-toluenesulfonate.—A solution of 0.334 g. (2.74 mmoles) of benzoic acid, 0.277 g. (2.79 mmoles) of cyclohexylamine, and 0.512 mmole) of the quaternary carbodiimide, 1-ethyl-3-[2-morpholinyl-(4)-ethyl] carbodiimide metho-p-toluenesulfonate, in 20 ml. of purified methylene chloride was stirred at room temperature for 10 hours. One drop of glacial acetic acid was added to decompose any unreacted carbodiimide and after standing an additional 15 minutes the solution was concentrated (aspirator) to dryness. After extraction of the residue with benzene there remained 0.510 g. (83.5% recovery) of unreacted cyclohexylammonium benzoate, M.P. 183–185° C. The benzene solution was washed with three 10 ml. portions of N hydrochloric acid and 10 ml. of N sodium bicarbonate. The dried (magnesium sulfate) solution was evaporated under reduced pressure and the crystalline residue recrystallized from benzene-iso-octane. The yield was 50 mg. (9%) of N-cyclohexylbenzamide melting at 147–149° C.

Example 39

To 4 ml. of a 5% gelatin solution at 35° C. was added in one portion 200 mg. of 1-ethyl-3-[2-morpholinyl-(4)-ethyl] carbodiimide metho-p-toluenesulfonate. Within 30 seconds the solution gelled, and did not reliquefy when heated to 95° C. In a separate and similar experiment the solution was allowed to stand overnight after gelling at 25° C., at which time the mixture had liquefied.

Various amounts of the carbodiimide were added at 35° C. to 5% gelatin solution at the isoelectric point, pH 5.1. After storing for 18 hours at 5° C. the melting point was determined.

| Carbodiimide, percent of gel weight: | Melting point, °C. |
|---|---|
| 0 | 33.0 |
| 2 | 33.0 |
| 5 | 34.9 |
| 10 | 52.5 |
| 25 | over 90.0 |

Example 40

Phenylacetanilide via 1-ethyl-3-phenylcarbodiimide.[1]—To a solution of 0.33 g. of phenylacetic acid and 0.225 g. of aniline in 25 ml. purified methylene chloride was added 0.5 g. of 1-ethyl-3-phenylcarbodiimide. After storage for 48 hours at 25° C. there was isolated phenylacetanilide, M.P. 116–118° C.

Example 41

Treatment of collagen with a water-soluble carbodiimide.—A presoaked (in distilled water) fiber of kangaroo tail tendon was immersed for 24 hours at 25° C. in 10% aqueous solution of 1-ethyl-3-[2-morpholinyl-(4)-ethyl] carbodiimide metho-p-toluenesulfonate.

The treated fiber shrank to a much less extent than did an untreated fiber when immersed in water at 90° C.

Example 42

To a solution of 2.0 g. of gelatin in 25.0 ml. of water was added 1.5 g. of 1-ethyl-3-[2-morpholinyl-(4)-ethyl] carbodiimide metho-p-toluenesulfonate. The solution gelled almost immediately (30 seconds), but liquefied on storage at room temperature for 16 hours. The resulting solution was dialyzed (using 8/32″ cellulose casing) for 4 days. The solution was freeze-dried to a white powder; weight 2.0 g. A Sorensen titration (G. Wilson, "Laboratory Manual of Physiological Chemistry," The Williams and Wilkins Co., Baltimore, Md., 1952, p. 72), on 0.4 g. required 0.25 ml. of 0.103 N sodium hydroxide. An untreated gelatin sample (0.4 g.) required 2.6 ml. A Van Slyke analysis yielded 0.19% nitrogen, while untreated gelatin yielded 0.64% nitrogen.

Example 43

A solution of 4.0 g. of gelatin in 50 ml. of water was gelled by mixing with 2.25 g. of 1-ethyl-3-[2-morpholinyl-(4)-ethyl] carbodiimide metho-p-toluenesulfonate. The gel was immediately freeze-dried, followed by trituration with 500 ml. of water. The resulting material after drying weighed 3.0 g. The wash water on evaporation yielded 2.3 g. of 1-ethyl-3-[2-morpholinyl-(4)-ethyl] urea metho-p-toluenesulfonate.

A 0.5 g. sample of the above-treated gelatin was dissolved in 20 ml. of a 50% calcium chloride solution by heating on a steam bath for 1 hour. A Sorensen titration required 0.65 ml. of 0.103 N sodium hydroxide.

When 0.1 g. of the gelatin prepared above was suspended in 2.0 ml. of water containing 75 mg. of 1-ethyl-3-[2-morpholinyl-(4)-ethyl] urea metho-p-toluenesulfonate, no liquefaction occurred even after 9 days. If, however, the carbodiimide was substituted for the urea, liquefaction occurred.

When conductometric amino titrations [S. Ellis and J. Parkhurst, Biochem. J., 52, 350 (1952)], were carried out on the gelatin products of a decrease in amino content as compared to untreated gelatin was observed.

Example 44

A solution of 0.2 g. of gelatin, 0.45 g. of urea and 0.15 g. of 1-ethyl-3-[2-morpholinyl-(4)-ethyl] carbodiimide metho-p-toluenesulfonate in 4.0 ml. of water gelled after 20 seconds. On storage overnight the reaction mixture liquefied.

Example 45

To a solution of 0.1 g. of benzoyl gelatin in 2 ml. of water was added 0.1 g. of 1-ethyl-3-[2-morpholinyl-(4)-ethyl] carbodiimide metho-p-toluenesulfonate. On stirring no sudden gelation occurred as with the control gelatin.

Example 46

The liquefied, dialyzed, and then freeze-dried gelatin of Example 42 was redissolved in water to produce a 5% solution. This solution was useful as a plasma substitute or blood plasma extender. It is devoid of amino acids other than those characteristic of gelatin. This new product permits the utilization of higher amino acid or protein content of gelatin in injectable form without the danger of gelation during or after injection. Thus, higher nutrient and plasma simulating values are possessed by the instant carbodiimide treated gelatin. Not only is this product a satisfactory substitute for blood plasma but by reason of the fact that it may be safely introduced into the body in large quantities it, as well as the other gelatin products of this invention, may be employed as a vehicle for the introduction by injection or orally of many medicines and foods, for example, antibiotics (e.g., penicillins, tetracyclines), insulin, glucose, or protein hydrolysates containing essential amino acids. The gelatin products of this invention, and of this example are useful in place of the oxypolygelatins as illustrated in Patents 2,591,133 and 2,811,482.

Example 47

The condensing action of carbodiimides upon gelatin to produce an insoluble gelatin is useful in the production of gelatin coated products having tough exteriors, suitable as enteric coatings, and preventing adhesion or agglomeration of the individual tablets, capsules, or if desired, microspheres.

Aspirin tablets were quickly dipped in a 5% aqueous gelatin solution and then allowed to dry. The aspirin tablets thus coated with gelatin were then passed through an aqueous solution of 10% 1-ethyl-3-[2-morpholinyl-(4)-ethyl] carbodiimide metho-p-toluenesulfonate, re- ---
[1] [Welth, Ber., 8, 1530 (1875).]

moved, quickly washed with water, and allowed to dry. The tablets were firm, non-tacky, with improved structural strength, not readily disintegratable in water, but readily soluble in the intestine.

Example 48

Soft gelatin capsules containing vitamins were passed through a 10% aqueous solution of 1-ethyl-3-[2-morpholinyl-(4)-ethyl] carbodiimide metho-p-toluenesulfonate, washed with water, and then dried. The capsules were non-adherent in the presence of atmospheric moisture and readily disintegrated upon oral administration. These capsules did not require treatment with lacquer to prevent agglomeration. In contrast to formaldehyde-treated gelatin which produced erratic enteric coatings that sometimes disintegrated in the stomach and at other times did not disintegrate at all and always became more insoluble upon standing, gelatin treated with carbodiimide in accordance with this procedure produced highly uniform capsules and gelatin coatings possessed of unvarying properties not changing with age.

Example 49

In the manufacture of soft gelatin capsules, the gelatin sheets were formulated with carbodiimide treated gelatin having a melting point of about 50° C., made as described in Example 39, plasticized with glycerine. The resulting soft capsules were moisture resistant.

Example 50

A 10% aqueous solution of carbodiimide treated gelatin, prepared as in Example 39, first paragraph, was whipped and aerated to a uniform foam and baked at 250° F. to dehydrate completely and sterilize the product. The carbodiimide gelatin foam was useful as a surgical sponge. It had low-water disintegrability properties and remained uniform upon long storage. It was eventually absorbed by body fluids when enclosed in an animal body cavity.

Example 51

A surgical sheep-gut suture was immersed in a 10% aqueous carbodiimide, 1-ethyl-3-[2-morpholinyl-(4)-ethyl] carbodiimide methyl-p-toluene sulfonate solution for 6 hours, and washed with water. It was found to be pliable but with a higher tensile strength than originally possessed by the untreated suture material.

Example 52

A wet, developed photographic silver emulsion negative film bearing a gelatin base emulsion on a cellulose acetate backing was dipped into a 5% aqueous carbodiimide, 1-cyclohexyl-3-(4-diethylaminocyclohexyl) carbodiimide metho-p-toluenesulfonate, for 5 minutes, removed, and washed with water. Even before drying, the hardening action upon the gelatin was noticeable. After drying, the hardness of the gelatin was prevailed in comparison with untreated gelatin emulsion films.

Example 53

A sample of woolen worsted cloth was immersed for 24 hours in a 5% aqueous solution of 1-cyclohexyl-3-(4-diethylaminocyclohexyl) carbodiimide metho-p-toluenesulfonate, removed, rinsed with water and dried. Upon testing this treated fabric for shrinkage by washing it in water, it was found to exhibit desirable reduced shrinkage as compared with an untreated control. It was also found to have improved feel, a desirable attribute of wool cloth.

Example 54

Otherwise like Example 53, using a silk cloth sample in place of the woolen worsted produced an improved silk having good lustre and crease resistance.

Example 55

A fur felt was immersed for 24 hours in a 5% aqueous solution of 1-cyclohexyl-3-(4-diethylaminocyclohexyl) carbodiimide metho-p-toluenesulfonate, removed, washed with water and dried. This felt showed improved dimensional stability upon repeated wetting and drying as compared with untreated felt.

Example 56

The methods of Examples 53 and 55 were modified to the extent of employing a pretreatment of the polypeptide material with 1% aqueous papain for 6 hours at a pH of 7.5, or, alternatively, a pretreatment with trisodium phosphate at pH 12 for 6 hours, before the carbodiimide treatment described in Examples 53 and 55 was carried out. These pretreatments were found especially effective.

Example 57

Chicken body feathers were washed in water and curled by drying and drawing over sharply curved surfaces. The curled feathers were treated with an organic solution of N,N'-dicyclohexylcarbodiimide, 10% in benzene, in excess. The resulting feathers showed increased water-repellency and improved fluffiness retention.

Example 58

Fine woman's hair, which had never been previously waved, was washed, dried and then wetted with a 5% aqueous solution of 1-ethyl-3-[2-morpholinyl-(4)-ethyl] carbodiimide metho-p-toluenesulfonate, portions of the hair were wound on plastic mandrels, using absorbent end papers, under tension and the hair was permitted to remain for 3 hours on the mandrels. Upon removing the end papers and mandrels, it was found that a firm curl with unimpaired hair gloss and texture resulted.

While the present invention has been described with reference to specific details and examples it should not be construed as limited thereby but instead reference should be had to the appended claims for a definition of the scope of the invention.

I claim:

1. In the formation of an amide by condensing an amine having at least one hydrogen atom attached to the amino nitrogen, with an organic carboxylic acid using as the condensing agent a monocarbodiimide having the formula R—N=C=N—R, wherein each R is a monovalent radical selected from the group consisting of alkyl radicals containing from 2 to 12 carbon atoms, mono-aryl-substituted lower alkyl radicals, di-lower alkylamino lower alkyl radicals, and morpholino-, piperidyl- and pyridyl-substituted lower alkyl radicals, and recovering the used condensing agent and the resulting amide condensation product.

2. The process of claim 1 wherein said monocarbodiimide is water-soluble.

3. The process of claim 1 wherein the amine is an amino acid.

4. The process of claim 1 wherein the organic carboxylic acid is an amino acid.

5. The process of claim 1 wherein at least one of the amide forming reactants is a peptide.

6. The process of claim 1 wherein at least one of the amide forming reactants is a protein.

7. The process of claim 1 wherein at least one of the amide forming reactants is collagen.

8. The process of claim 1 wherein both amide forming reactants are provided by a protein.

9. In the formation of an amide by condensing an amine, having at least one hydrogen atom attached to the amino-nitrogen, with an organic carboxylic acid using as the condensing agent an aqueous solution of a water-soluble monocarbodiimide having the formula R—N=C=N—R wherein each R is a monovalent radical selected from the group consisting of alkyl radicals containing from 2 to 12 carbon atoms, monoaryl-substituted lower alkyl radicals, di-lower alkylamino lower alkyl radicals, and morpholino-, piperidyl- and pyridyl-substituted lower alkyl radicals.

10. The method of preparing a modified gelatin comprising mixing a water-soluble monocarbodiimide with an aqueous solution of gelatin and recovering the modified gelatin from said solution, said monocarbodiimide having the formula R—N=C=N—R wherein each R is a monovalent radical selected from the group consisting of alkyl radicals containing from 2 to 12 carbon atoms, monoaryl-substituted lower alkyl radicals, di-lower alkylamino lower alkyl radicals, and morpholino-, piperidyl- and pyridyl-substituted lower alkyl radicals.

11. The method of preparing a modified gelatin comprising mixing a sufficient proportion of a water-soluble monocarbodiimide with an aqueous solution of gelatin to produce a modified gelatin having its original amino acid content but with a Van Slyke free amino-nitrogen analysis of less than about 95 percent of the Van Slyke free amino-nitrogen analysis of the corresponding untreated gelatin, said monocarbodiimide having the formula R—N=C=N—R wherein each R is a monovalent radical selected from the group consisting of alkyl radicals containing from 2 to 12 carbon atoms, monoaryl-substituted lower alkyl radicals, di-lower alkyl-amino lower alkyl radicals, and morpholino-, piperidyl- and pyridyl-substituted lower alkyl radicals.

12. The method of preparing a modified gelatin comprising mixing a sufficient proportion of a water-soluble monocarbodiimide with an aqueous solution of gelatin to produce a modified gelatin having its original amino acid content, but with a Van Slyke free amino-nitrogen analysis of less than about 25 percent of the Van Slyke free amino-nitrogen analysis of the corresponding untreated gelatin, said monocarbodiimide having the formula R—N=C=N—R wherein each R is a monovalent radical selected from the group consisting of alkyl radicals containing from 2 to 12 carbon atoms, monoaryl-substituted lower alkyl radicals, di-lower alkyl-amino lower alkyl radicals, and morpholino-, piperidyl- and pyridyl-substituted lower alkyl radicals.

13. A modified gelatin characterized by the property of having a substantial proportion of its free carboxyl groups condensed with a substantial proportion of its free amino groups.

14. A modified gelatin free from added residues and having a melting point of at least 5° C. greater than the corresponding unmodified gelatin and an acylated lysine ε-amino content of at least about 5 percent.

15. An aqueous dispersion of the modified gelatin of claim 14.

16. A modified gelatin free from added residues and having a Van Slyke free amino-nitrogen analysis of less than about 95 percent of the Van Slyke free amino-nitrogen analysis of the corresponding untreated gelatin.

17. An aqueous dispersion of the modified gelatin of claim 16.

18. In the formation of an amide by condensing an amine, having at least one hydrogen atom attached to the amino-nitrogen, with an organic carboxylic acid using a monocarbodiimide condensing agent, separating the used condensing agent from the resulting amide condensation product, regenerating the used condensing agent to produce more monocarbodiimide and recycling the monocarbodiimide to effect additional formation of amide, said monocarbodiimide having the formula R—N=C=N—R wherein each R is a monovalent radical selected from the group consisting of alkyl radicals containing from 2 to 12 carbon atoms, monoaryl-substituted lower alkyl radicals, di-lower alkyl-amino lower alkyl radicals, and morpholino-, piperidyl- and pyridyl-substituted lower alkyl radicals.

19. In the formation of an amide by condensing an amine, having at least one hydrogen atom attached to the amino-nitrogen, with an organic carboxylic acid using as the condensing agent an aqueous solution of a water-soluble monocarbodiimide, separating the spent water-soluble monocarbodiimide from the condensation product, regenerating the monocarbodiimide and recycling the regenerated monocarbodiimide to effect additional formation of amide, said monocarbodiimide having the formula R—N=C=N—R wherein each R is a monovalent radical selected from the group consisting of alkyl radicals containing from 2 to 12 carbon atoms, monoaryl-substituted lower alkyl radicals, di-lower alkyl-amino lower alkyl radicals, and morpholino-, piperidyl- and pyridyl-substituted lower alkyl radicals.

20. The process of claim 1 wherein both amide forming reactants are provided by an amino acid.

21. The process of claim 1 wherein at least one of the amide forming reactants is a protein fiber.

22. In the formation of an amide by condensing an amine having at least one hydrogen atom attached to the amino nitrogen, with an organic carboxylic acid using as the condensing agent, 1-ethyl-3-phenylcarbodiimide.

References Cited in the file of this patent

UNITED STATES PATENTS

| | | |
|---|---|---|
| 2,284,896 | Hanford et al. | June 2, 1942 |
| 2,786,049 | Lundgren et al. | Mar. 19, 1957 |
| 2,793,204 | Arens | May 21, 1957 |
| 2,850,496 | Hardman | Sept. 2, 1958 |
| 2,891,059 | Malz et al. | June 16, 1959 |